(12) United States Patent
Tamatani

(10) Patent No.: US 12,112,898 B2
(45) Date of Patent: Oct. 8, 2024

(54) ELECTROLYTIC CAPACITOR AND METHOD FOR MANUFACTURING ELECTROLYTIC CAPACITOR

(71) Applicant: Murata Manufacturing Co., Ltd., Nagaokakyo (JP)

(72) Inventor: Yasuhiro Tamatani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 13 days.

(21) Appl. No.: 17/852,670

(22) Filed: Jun. 29, 2022

(65) Prior Publication Data

US 2022/0344102 A1    Oct. 27, 2022

Related U.S. Application Data

(63) Continuation of application No. PCT/JP2020/047618, filed on Dec. 21, 2020.

(30) Foreign Application Priority Data

Jan. 9, 2020    (JP) ................................. 2020-002218

(51) Int. Cl.
*H01G 9/012* (2006.01)
*H01G 9/045* (2006.01)
(Continued)

(52) U.S. Cl.
CPC ............. *H01G 9/012* (2013.01); *H01G 9/045* (2013.01); *H01G 9/048* (2013.01); *H01G 9/10* (2013.01); *H01G 9/14* (2013.01); *H01G 9/15* (2013.01)

(58) Field of Classification Search
None
See application file for complete search history.

(56) References Cited

U.S. PATENT DOCUMENTS 7,589,951 B2    9/2009  Kunishi et al.
10,340,092 B2   7/2019  Demizu et al.
(Continued)

FOREIGN PATENT DOCUMENTS

CN    101346785 A    1/2009
CN    107527741 A    12/2017
(Continued)

OTHER PUBLICATIONS

International Search Report in PCT/JP2020/047618, mailed Mar. 9, 2021, 3 pages.

*Primary Examiner* — Eric W Thomas
(74) *Attorney, Agent, or Firm* — ArentFox Schiff LLP

(57) ABSTRACT

An electrolytic capacitor that includes a cuboidal resin molding including a first end surface, a second end surface, a laminate of capacitor elements each including an anode and a cathode opposite to the anode, and a sealing resin sealing the laminate; a first external electrode on the first end surface of the resin molding and electrically connected to the anode exposed at the first end surface; and a second external electrode on the second end surface of the resin molding and electrically connected to the cathode exposed at the second end surface, wherein the first external electrode includes, sequentially from a side thereof adjacent to the first end surface of the resin molding, a first thermal spraying electrode layer and a second thermal spraying electrode layer in contact with the first thermal spraying electrode layer and having a higher porosity than the first thermal spraying electrode layer.

20 Claims, 4 Drawing Sheets

(51) Int. Cl.
    *H01G 9/048*     (2006.01)
    *H01G 9/10*     (2006.01)
    *H01G 9/14*     (2006.01)
    *H01G 9/15*     (2006.01)

(56) References Cited

U.S. PATENT DOCUMENTS

| | | |
|---|---|---|
| 2008/0123249 A1 | 5/2008 | Kunishi et al. |
| 2010/0165547 A1 | 7/2010 | Kuranuki et al. |
| 2011/0157767 A1* | 6/2011 | Hur .................... H01G 4/01 |
| | | 361/303 |
| 2017/0365415 A1 | 12/2017 | Demizu et al. |
| 2018/0286583 A1* | 10/2018 | Onoue .................... H01G 4/012 |
| 2022/0189696 A1* | 6/2022 | Yi .................... H01G 4/232 |

FOREIGN PATENT DOCUMENTS

| | | |
|---|---|---|
| JP | H04123413 A | 4/1992 |
| JP | H04188814 A | 7/1992 |
| JP | 2006-351830 A | 12/2006 |
| JP | 2008-042068 A | 2/2008 |
| JP | 2009076872 A | 4/2009 |
| JP | 2011249707 A | 12/2011 |
| JP | 2013-214607 A | 10/2013 |
| JP | 2015170695 A | 9/2015 |

* cited by examiner 11a,13a 11b,13b

40

ELECTROLYTIC CAPACITOR AND METHOD FOR MANUFACTURING ELECTROLYTIC CAPACITOR

CROSS REFERENCE TO RELATED APPLICATIONS

The present application is a continuation of International application No. PCT/JP2020/047618, filed Dec. 21, 2020, which claims priority to Japanese Patent Application No. 2020-002218, filed Jan. 9, 2020, the entire contents of each of which are incorporated herein by reference.

FIELD OF THE INVENTION

The present invention relates to an electrolytic capacitor and a method of producing an electrolytic capacitor.

BACKGROUND OF THE INVENTION

An electrolytic capacitor such as a solid electrolytic capacitor is produced by, for example, forming a dielectric layer on a surface of an anode made of a valve-action metal and subsequently forming a cathode such that the cathode is opposite to the anode.

For example, Patent Literature 1 discloses a multilayer solid electrolytic capacitor including a laminate of multiple solid electrolytic capacitor units each including a pair of electrodes including a first electrode and a second electrode, and a dielectric film and a solid electrolyte between the electrodes, wherein connection ends of the first electrodes are aligned and facing one side of the laminate and bonded to one conductor, connection ends of the second electrodes are aligned and facing the other side of the laminate and bonded to another conductor, and one or both of the conductor bonded to the first electrodes and the conductor bonded to the second electrodes is formed by thermal spraying of a conductive material.

Patent Literature 1: JP H04-188814 A

SUMMARY OF THE INVENTION

In the multilayer solid electrolytic capacitor according to Patent Literature 1, the conductor to which the electrodes of the units are bonded is formed by thermal spraying, so that the electrodes are very strongly bonded to the conductor, and the contact resistance between the electrodes and the conductor is low, resulting in low impedance in a high frequency range. Presumably, this prevents an increase in equivalent series resistance (ESR) regardless of an increase in contact sites resulting from a large number of units. However, the multilayer solid electrolytic capacitor according to Patent Literature 1 still has a room for further improvement in reducing the ESR by improving the structure of the conductor formed by thermal spraying.

The present invention was made to solve the above issue, and aims to provide an electrolytic capacitor having a lower ESR. The present invention also aims to provide a method of producing the electrolytic capacitor.

The electrolytic capacitor of the present invention includes: a cuboidal resin molding including a first end surface, a second end surface, a laminate of capacitor elements each including an anode with a dielectric layer on a surface thereof and a cathode opposite to the anode, and a sealing resin sealing the laminate; a first external electrode on the first end surface of the resin molding and electrically connected to the anode exposed at the first end surface; and a second external electrode on the second end surface of the resin molding and electrically connected to the cathode exposed at the second end surface, wherein the first external electrode includes, sequentially from a side thereof adjacent to the first end surface of the resin molding, a first thermal spraying electrode layer; and a second thermal spraying electrode layer in contact with the first thermal spraying electrode layer and having a higher porosity than the first thermal spraying electrode layer.

The method of producing an electrolytic capacitor of the present invention includes: forming a first external electrode on a first end surface of a resin molding and electrically connected to an anode exposed at the first end surface, the forming of the first external electrode includes, sequentially from a side adjacent to the first end surface: performing a first thermal spraying on the first end surface of the resin molding to form a first thermal spraying electrode layer, and performing a second thermal spraying on the first thermal spraying electrode layer to form a second thermal spraying electrode layer in contact with the first thermal spraying electrode layer and having a higher porosity than the first thermal spraying electrode layer; and forming a second external electrode on a second end surface of the resin molding and electrically connected to a cathode exposed at the second end surface.

The present invention can provide an electrolytic capacitor having a lower ESR. The present invention can also provide a method of producing the electrolytic capacitor.

DETAILED DESCRIPTION OF THE PREFERRED EMBODIMENTS

Figure 1:
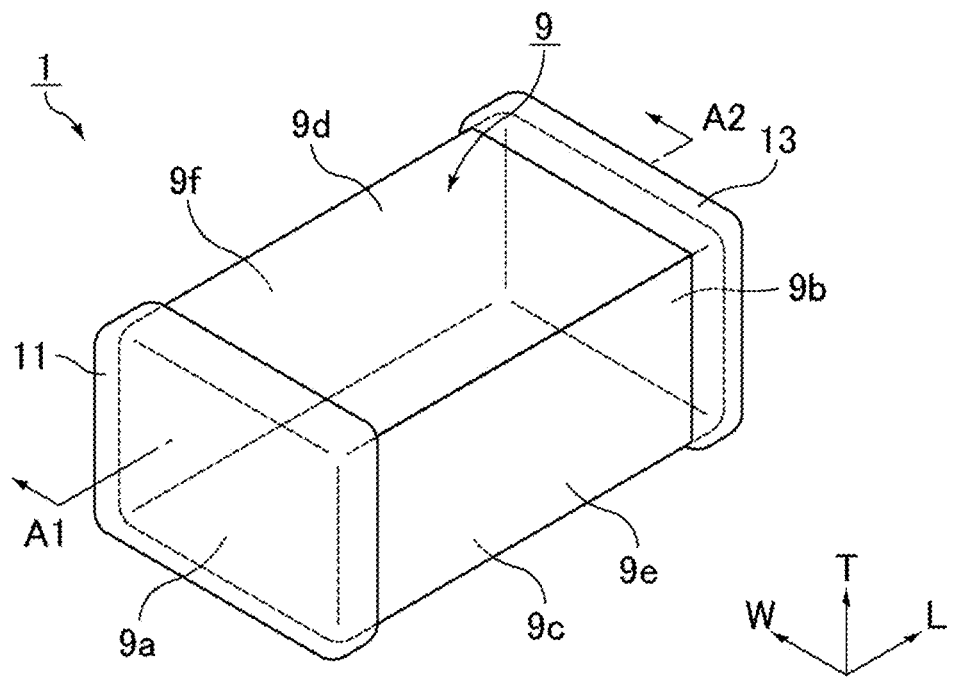
FIG. 1 is a schematic perspective view showing an electrolytic capacitor of Embodiment 1 of the present invention.

The electrolytic capacitor of the present invention and the method of producing an electrolytic capacitor of the present invention are described below. The present invention is not limited to the following preferred embodiments, and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the electrolytic capacitor of each embodiment is simply referred to as "the electrolytic capacitor of the present invention" when no distinction is made between the embodiments.

Embodiment 1

The electrolytic capacitor of the present invention includes: a cuboidal resin molding including a first end surface, a second end surface, a laminate of capacitor elements each including an anode with a dielectric layer on a surface thereof and a cathode opposite to the anode, and a sealing resin sealing the laminate; a first external electrode on the first end surface of the resin molding and electrically connected to the anode exposed at the first end surface; and a second external electrode on the second end surface of the resin molding and electrically connected to the cathode exposed at the second end surface, wherein the first external electrode includes, sequentially from a side thereof adjacent to the first end surface of the resin molding: a first thermal spraying electrode layer, and a second thermal spraying electrode layer in contact with the first thermal spraying electrode layer and having a higher porosity than the first thermal spraying electrode layer. In the electrolytic capacitor of the present invention, the second external electrode may include, sequentially from a side thereof adjacent to the second end surface of the resin molding, a third thermal spraying electrode layer, and a fourth thermal spraying electrode layer in contact with the third thermal spraying electrode layer and having a higher porosity than the third thermal spraying electrode layer. Further, in the electrolytic capacitor of the present invention, the first external electrode may include a first outer plating layer on a surface of the second thermal spraying electrode layer on a side thereof opposite to the first thermal spraying electrode layer, and the second external electrode may include a second outer plating layer on a surface of the fourth thermal spraying electrode layer on a side thereof opposite to the third thermal spraying electrode layer. Such a case is described below as an electrolytic capacitor of Embodiment 1 of the present invention.

FIG. 1 is a schematic perspective view showing an electrolytic capacitor of Embodiment 1 of the present invention. As shown in FIG. 1, an electrolytic capacitor 1 includes a resin molding 9, a first external electrode 11, and a second external electrode 13.

Herein, a length direction, a width direction, and a thickness direction of the electrolytic capacitor (resin molding, first external electrode, or second external electrode) are directions indicated by an arrow L, an arrow W, and an arrow T, respectively, as shown in FIG. 1 and elsewhere. Here, the length direction L, the width direction W, and the thickness direction T are perpendicular to one another.

Herein, in the electrolytic capacitor (resin molding, first external electrode, or second external electrode), a plane along the length direction L and the thickness direction T is referred to as an "LT plane", a plane along the length direction L and the width direction W is referred to as an "LW plane", and a plane along the width direction W and the thickness direction T is referred to as a "WT plane".

The resin molding 9 is cuboidal, and includes a first end surface 9a and a second end surface 9b (WT planes) opposite to each other in the length direction L; a bottom surface 9c and a top surface 9d (LW planes) opposite to each other in the thickness direction T, and a first side surface 9e and a second side surface 9f (LT planes) opposite to each other in the width direction W.

The first external electrode 11 is on the first end surface 9a of the resin molding 9, and extends to a portion of the bottom surface 9c, a portion of the top surface 9d, a portion of the first side surface 9e, and a portion of the second side surface 9f.

The second external electrode 13 is on the second end surface 9b of the resin molding 9, and extends to a portion of the bottom surface 9c, a portion of the top surface 9d, a portion of the first side surface 9e, and a portion of the second side surface 9f.

Figure 2:
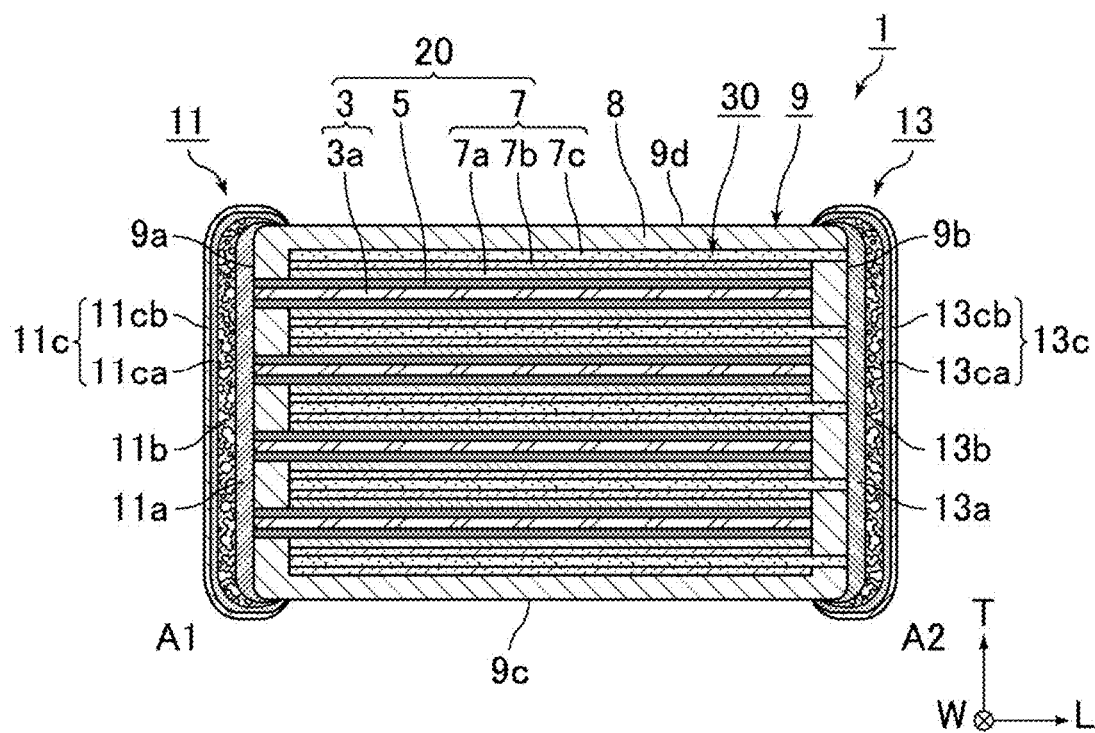
FIG. 2 is a schematic cross-sectional view showing a portion corresponding to a segment A1-A2 in FIG. 1.

FIG. 2 is a schematic cross-sectional view showing a portion corresponding to a segment A1-A2 in FIG. 1. As shown in FIG. 2, the resin molding 9 includes a laminate 30 of multiple capacitor elements 20, and a sealing resin 8 sealing the laminate 30. The capacitor elements 20 may be bonded to each other via a conductive adhesive.

The laminate 30 preferably includes multiple capacitor elements 20, but may include one capacitor element 20.

Each capacitor element 20 includes an anode 3 with a dielectric layer 5 on a surface thereof and a cathode 7 opposite to the anode 3. More specifically, in each capacitor element 20, the cathode 7 is opposite to the anode 3 across the dielectric layer 5.

The anode 3 is exposed at the first end surface 9a of the resin molding 9 and electrically connected to the first external electrode 11.

The anode 3 includes a valve-action metal substrate 3a in the center and a porous layer (not shown) in a surface of the anode 3. The dielectric layer 5 is disposed on a surface of the porous layer.

Examples of valve-action metal of the valve-action metal substrate 3a include elemental metals such as aluminum, tantalum, niobium, titanium, zirconium, magnesium, and silicon, and alloys containing at least one of these metals. In particular, aluminum and an aluminum alloy are preferred.

The valve-action metal substrate 3a is preferably a flat plate, more preferably foil.

Preferably, the porous layer is an etched layer that is etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm or more. The thickness of the non-etched core of the valve-action metal substrate 3a is preferably 70 μm or less. The thickness of the porous layer is designed according to the withstand voltage and capacitance required for the electrolytic capacitor 1. In the LT plane shown in FIG. 2, the total thickness of the porous layers on both sides of the valve-action metal substrate 3a is preferably 10 μm to 120 μm.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that serves as the dielectric layer 5 is formed. The dielectric layer 5 is formed along the surface of the porous layer, whereby pores (recesses) are formed in the dielectric layer 5.

The thickness of the dielectric layer 5 is designed according to the withstand voltage, capacitance, and the like required for the electrolytic capacitor 1. The thickness is preferably 10 nm to 100 nm.

The cathode 7 (here, a cathode lead-out layer 7c described later) is exposed at the second end surface 9b of the resin molding 9 and electrically connected to the second external electrode 13.

The cathode 7 includes a solid electrolyte layer 7a on the dielectric layer 5, a conductive layer 7b on the solid electrolyte layer 7a, and a cathode lead-out layer 7c on the conductive layer 7b. The electrolytic capacitor 1 includes the solid electrolyte layer 7a as a part of the cathode 7, and is thus regarded as a solid electrolytic capacitor.

The electrolytic capacitor of the present invention may be an electrolytic capacitor including an electrolytic solution instead of a solid electrolyte; or may be an electrolytic capacitor including a solid electrolyte and an electrolytic solution.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer 7a is formed by, for example, a method in which a polymerized film of poly(3,4-ethylenedioxythiophene) or the like is formed on a surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the treatment liquid or dispersion to the surface of the dielectric layer 5 by, for example, sponge transfer, screen printing, spray coating, inkjet printing, or using a dispenser. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

The thickness of the solid electrolyte layer 7a is preferably 2 μm to 20 μm.

The conductive layer 7b is disposed to electrically and mechanically connect the solid electrolyte layer 7a to the cathode lead-out layer 7c.

The conductive layer 7b is formed by applying a conductive paste such as a carbon paste, a graphene paste, or a silver paste to a surface of the solid electrolyte layer 7a by a method such as dipping, sponge transfer, screen printing, spray coating, inkjet printing, or using a dispenser.

Preferably, the conductive layer 7b is a carbon layer, a graphene layer, or a silver layer formed as described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 μm to 20 μm.

The cathode lead-out layer 7c is, for example, metal foil, a printed electrode layer, or a coating electrode layer.

When the cathode lead-out layer 7c is metal foil, preferably, the metal foil is made of at least one metal selected from the group consisting of aluminum, copper, silver, and an alloy containing at least one of these metals as a main component. When the metal foil is made of at least one of the above metals, the electrolytic capacitor 1 tends to have a lower ESR because such metal foil has a lower resistance.

The metal foil may be metal foil whose surface is coated with carbon, titanium, or the like by a film forming method such as sputtering or vapor deposition. In particular, use of carbon-coated aluminum foil is preferred.

In terms of better handling in the production process, miniaturization, and reduction in ESR, the thickness of the metal foil is preferably 20 μm to 50 μm.

When the cathode lead-out layer 7c is a printed electrode layer, the printed electrode layer is formed on a predetermined region by applying an electrode paste to a surface of the conductive layer 7b by, for example, sponge transfer, screen printing, or inkjet printing.

When the cathode lead-out layer 7c is a coating electrode layer, the coating electrode layer is formed on a predetermined region by applying an electrode paste to the surface of the conductive layer 7b by, for example, dipping, spray coating, or using a dispenser.

Preferably, the electrode paste contains silver, copper, or nickel as a main component thereof.

A printed electrode layer can be made thinner than the metal foil. For example, screen printing of the printed electrode layer can achieve a thickness of 20 μm or less.

Preferably, the cathode lead-out layer 7c is disposed on the conductive layer 7b while the conductive layer 7b is viscous before drying.

In the capacitor element 20, the valve-action metal substrate 3a is configured such that its end adjacent to the second end surface 9b of the resin molding 9 is sealed by the sealing resin 8. Thus, the valve-action metal substrate 3a is not in direct contact with the solid electrolyte layer 7a or the conductive layer 7b. The end of the valve-action metal substrate 3a adjacent to the second end surface 9b of the resin molding 9, when covered with the dielectric layer 5 or the like for insulation, may be covered with the solid electrolyte layer 7a and the conductive layer 7b.

The sealing resin 8 contains at least a resin, and preferably contains a resin and filler.

Examples of the resin include an epoxy resin, a phenolic resin, a polyimide resin, a silicone resin, a polyamide resin, and a liquid crystal polymer.

Examples of the filler include silica particles, alumina particles, and metal particles.

The sealing resin 8 may be in a solid or liquid form. Preferably, the sealing resin 8 includes a material containing a solid epoxy resin, a phenolic resin and silica particles.

In use of the solid sealing resin 8, the resin molding 9 is preferably formed by a method that uses a resin mold such as a compression mold or a transfer mold, with a compression mold being more preferred. In use of the liquid sealing resin 8, the resin molding is preferably formed by a method that uses a dispenser or printing. In particular, preferably, the laminate 30 is sealed by the sealing resin 8 using a compression mold to produce the resin molding 9.

The resin molding 9 may have rounded corners. The corners of the resin molding 9 may be rounded by barrel polishing, for example. A resin molding is softer than a ceramic body and is thus difficult to form round corners by barrel polishing. Yet, the corners can be finely rounded by adjusting the specifications of a medium such as composition, particle size, and shape as well as duration of treatment with a barrel, and the like.

The first external electrode 11 is on the first end surface 9a of the resin molding 9 and electrically connected to the anode 3 exposed at the first end surface 9a.

The first external electrode 11 includes, sequentially from a side thereof adjacent to the first end surface 9a of the resin molding 9, a first thermal spraying electrode layer 11a and a second thermal spraying electrode layer 11b.

The first thermal spraying electrode layer 11a covers the entire first end surface 9a of the resin molding 9. The first thermal spraying electrode layer 11a is formed by thermal spraying. This results in a lower bulk resistance (internal resistance) of the first external electrode 11, and a lower contact resistance between the first external electrode 11 and electrodes of a circuit board, when the electrolytic capacitor 1 is mounted on the circuit board. This also results in a higher adhesion between the first thermal spraying electrode layer 11a and the resin molding 9 (especially the anode 3), and a lower contact resistance therebetween. Thus, the electrolytic capacitor 1 has a lower ESR.

The second thermal spraying electrode layer 11b is in contact with the first thermal spraying electrode layer 11a and has a higher porosity than the first thermal spraying electrode layer 11a. In other words, the second thermal spraying electrode layer 11b has a larger surface area than the first thermal spraying electrode layer 11a. Thus, the second thermal spraying electrode layer 11b has a larger contact area with a first outer plating layer 11c (described later), allowing the first outer plating layer 11c to easily adhere to the second thermal spraying electrode layer 11b, resulting in a higher adhesion therebetween. Thus, the electrolytic capacitor 1 has a lower ESR.

The second external electrode 13 is on the second end surface 9b of the resin molding 9 and electrically connected to the cathode 7 exposed at the second end surface 9b.

The second external electrode 13 includes, sequentially from a side thereof adjacent to the second end surface 9b of the resin molding 9, a third thermal spraying electrode layer 13a and a fourth thermal spraying electrode layer 13b.

The third thermal spraying electrode layer 13a covers the entire second end surface 9b of the resin molding 9. The third thermal spraying electrode layer 13a is formed by thermal spraying. This results in a lower bulk resistance (internal resistance) of the second external electrode 13, and a lower contact resistance between the second external electrode 13 and electrodes of a circuit board, when the electrolytic capacitor 1 is mounted on the circuit board. This also results in a higher adhesion between the third thermal spraying electrode layer 13a and the resin molding 9 (especially the cathode 7), and a lower contact resistance therebetween. Thus, the electrolytic capacitor 1 has a lower ESR.

The fourth thermal spraying electrode layer 13b is in contact with the third thermal spraying electrode layer 13a and has a higher porosity than the third thermal spraying electrode layer 13a. In other words, the fourth thermal spraying electrode layer 13b has a larger surface area than the third thermal spraying electrode layer 13a. Thus, the fourth thermal spraying electrode layer 13b has a larger contact area with a second outer plating layer 13c (described later), allowing the second outer plating layer 13c to easily adhere to the fourth thermal spraying electrode layer 13b, resulting in a higher adhesion therebetween. Thus, the electrolytic capacitor 1 has a lower ESR.

Figure 3:
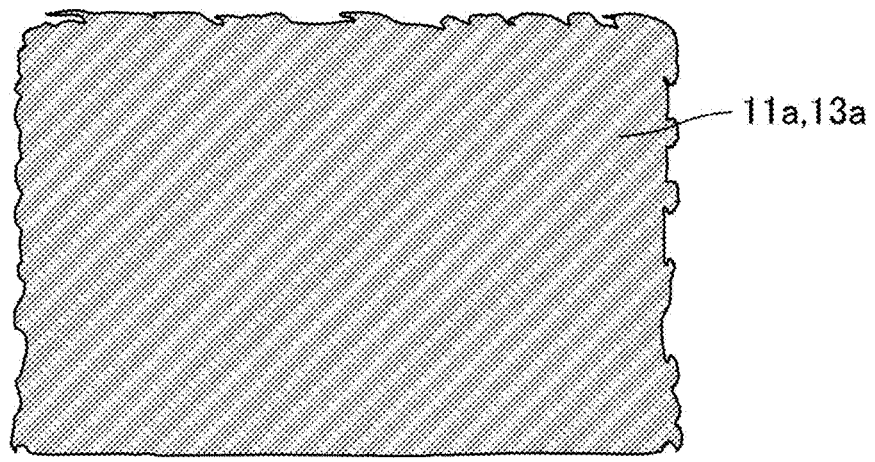
FIG. 3 is a schematic view showing an example of a WT plane of a first thermal spraying electrode layer (a third thermal spraying electrode layer) in FIG. 2.

FIG. 3 is a schematic view showing an example of the WT plane of the first thermal spraying electrode layer (the third thermal spraying electrode layer) in FIG. 2. The first thermal spraying electrode layer 11a and the third thermal spraying electrode layer 13a refer to thermal spraying electrode layers each in which a state with a porosity of 0% or more and less than 5% (preferably 0%) in the WT plane is sequentially repeated in the length direction L. In each of the first thermal spraying electrode layer 11a and the third thermal spraying electrode layer 13a, the state with a porosity of 0% or more and less than 5% in the WT plane may be sequentially repeated in the length direction L, with the porosity being constant or variable. Pores in the first thermal spraying electrode layer 11a and the third thermal spraying electrode layer 13a refer to regions without constituent materials derived from the first thermal spraying electrode layer 11a and the third thermal spraying electrode layer 13a, respectively. The porosity in the WT plane of the first thermal spraying electrode layer 11a refers to the ratio of area occupied by the pores to the total area of the first thermal spraying electrode layer 11a (including the pores). The porosity in the WT plane of the third thermal spraying electrode layer 13a refers to the ratio of area occupied by the pores to the total area of the third thermal spraying electrode layer 13a (including the pores). These ratios are calculated from CT scan images of the respective WT planes.

Figure 4:
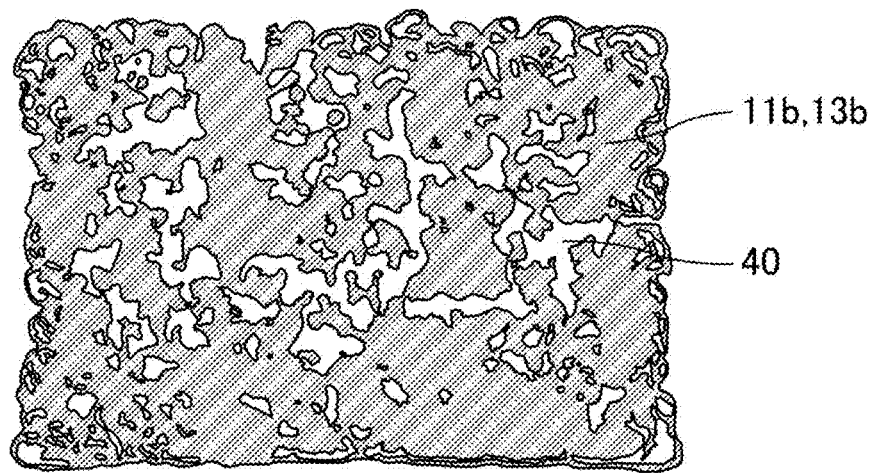
FIG. 4 is a schematic view showing an example of a WT plane of a second thermal spraying electrode layer (a fourth thermal spraying electrode layer) in FIG. 2.

FIG. 4 is a schematic view showing an example of the WT plane of the second thermal spraying electrode layer in FIG. 2. The second thermal spraying electrode layer 11b and the fourth thermal spraying electrode layer 13b refer to thermal spraying electrode layers each in which a state with a porosity of 5% or more and less than 100% (preferably 30% to 90%) in the WT plane is sequentially repeated in the length direction L. In each of the second thermal spraying electrode layer 11b and the fourth thermal spraying electrode layer 13b, the state with a porosity of 5% or more and less than 100% in the WT plane may be sequentially repeated in the length direction L with the porosity being constant or variable. In each of the second thermal spraying electrode layer 11b and the fourth thermal spraying electrode layer 13b, preferably, the porosity in the WT plane continuously increases from a side adjacent to the resin molding 9 to a side away from the resin molding 9. Pores 40 in the second thermal spraying electrode layer 11b and the fourth thermal spraying electrode layer 13b refer to regions without constituent materials derived from the second thermal spraying electrode layer 11b and the fourth thermal spraying electrode layer 13b, respectively. The porosity in the WT plane of the second thermal spraying electrode layer 11b refers to the ratio of area occupied by the pores 40 to the total area of the second thermal spraying electrode layer 11b (including the pores). The porosity in the WT plane of the fourth thermal spraying electrode layer 13b refers to the ratio of area occupied by the pores 40 to the total area of the fourth thermal spraying electrode layer 13b (including the pores). These ratios are calculated from CT scan images of the respective WT planes.

Images of the WT planes of the first thermal spraying electrode layer 11a, the third thermal spraying electrode layer 13a, the second thermal spraying electrode layer 11b, and the fourth thermal spraying electrode layer 13b are taken with, for example, CT scan "inspeXio SMX-225 CT" available from Shimadzu Corporation.

Thermal spraying electrode layers such as the first thermal spraying electrode layer 11a, the third thermal spraying electrode layer 13a, the second thermal spraying electrode layer 11b, and the fourth thermal spraying electrode layer 13b can be distinguished from electrode layers formed by a method other than thermal spraying, based on information such as uneven outer edges in CT scan images of the WT planes and detection of oxygen (i.e., occurrence of oxidation) by energy dispersive X-ray analysis (EDX).

Preferably, the first thermal spraying electrode layer 11a and the second thermal spraying electrode layer 11b contain the same metal as a main component thereof. This reduces the contact resistance between the first thermal spraying electrode layer 11a and the second thermal spraying electrode layer 11b, so that the electrolytic capacitor 1 tends to have a lower ESR.

Preferably, each of the first thermal spraying electrode layer 11a and the second thermal spraying electrode layer 11b contains copper, nickel, or a nickel-aluminum alloy as a main component thereof. This tends to reduce the contact resistance between the first thermal spraying electrode layer 11a and the anode 3, so that the electrolytic capacitor 1 tends to have a lower ESR, compared to when the first thermal spraying electrode layer 11a contains a different metal as a main component thereof.

Preferably, the third thermal spraying electrode layer 13a and the fourth thermal spraying electrode layer 13b contain the same metal as a main component thereof. This reduces the contact resistance between the third thermal spraying electrode layer 13a and the fourth thermal spraying electrode layer 13b, so that the electrolytic capacitor 1 tends to have a lower ESR.

Preferably, each of the third thermal spraying electrode layer 13a and the fourth thermal spraying electrode layer 13b contains copper, nickel, or a nickel-aluminum alloy as a main component thereof. This tends to reduce the contact resistance between the third thermal spraying electrode layer 13a and the cathode 7, so that the electrolytic capacitor 1 tends to have a lower ESR, compared to when the third thermal spraying electrode layer 13a contains a different metal as a main component thereof.

The metal as the main component of the first thermal spraying electrode layer 11a and the second thermal spraying electrode layer 11b may be different from the metal as the main component of the third thermal spraying electrode layer 13a and the fourth thermal spraying electrode layer 13b, but the same metal is preferred.

Herein, the main component of each layer or electrode refers to a highest content component of each layer or electrode. The main component of each layer or electrode can be confirmed by exposing the LT plane shown in FIG. 2 and elsewhere and then performing elemental analysis such as energy dispersive X-ray analysis.

A total thickness of the first thermal spraying electrode layer 11a and the second thermal spraying electrode layer 11b is preferably 40 µm to 120 µm. This tends to reduce the ESR of the electrolytic capacitor 1 and results in a higher adhesion between the first thermal spraying electrode layer 11a and the resin molding 9 (especially the anode 3), thus reducing appearance defects such as delamination and smearing of the first thermal spraying electrode layer 11a.

A total thickness of the third thermal spraying electrode layer 13a and the fourth thermal spraying electrode layer 13b is preferably 40 µm to 120 µm. This tends to reduce the ESR of the electrolytic capacitor 1 and results in a higher adhesion between the third thermal spraying electrode layer 13a and the resin molding 9 (especially the cathode 7), thus reducing appearance defects such as delamination and smearing of the third thermal spraying electrode layer 13a.

The total thickness of the first thermal spraying electrode layer 11a and the second thermal spraying electrode layer 11b may be different from or the same as the total thickness of the third thermal spraying electrode layer 13a and the fourth thermal spraying electrode layer 13b.

The first external electrode 11 includes the first outer plating layer 11c on a surface of the second thermal spraying electrode layer 11b on a side thereof opposite to the first thermal spraying electrode layer 11a. The first outer plating layer 11c, which is relatively dense, covers the second thermal spraying electrode layer 11b having a higher porosity than the first thermal spraying electrode layer 11a, so that the electrolytic capacitor 1 tends to have a lower ESR.

Preferably, the first outer plating layer 11c and the second thermal spraying electrode layer 11b contain the same metal as a main component thereof. This reduces the contact resistance between the first outer plating layer 11c and the second thermal spraying electrode layer 11b, so that the electrolytic capacitor 1 tends to have a lower ESR.

The first outer plating layer 11c preferably contains copper, nickel, or tin as a main component thereof. This tends to reduce the ESR of the electrolytic capacitor 1. Here, the first outer plating layer 11c may have a single layer structure or a multilayer structure. When the first outer plating layer 11c has a multilayer structure of multiple layers, preferably, a layer in contact with the second thermal spraying electrode layer 11b contains copper, nickel, or tin as a main component thereof.

When the first outer plating layer 11c has a multilayer structure, the first outer plating layer 11c may include, sequentially from a side adjacent to the second thermal spraying electrode layer 11b, a first sub-outer plating layer 11ca and a second sub-outer plating layer 11cb.

Preferably, the first sub-outer plating layer 11ca is a nickel plating layer containing nickel as a main component thereof.

Preferably, the second sub-outer plating layer 11cb is a tin plating layer containing tin as a main component thereof.

The second external electrode 13 includes the second outer plating layer 13c on a surface of the fourth thermal spraying electrode layer 13b on a side opposite to the third thermal spraying electrode layer 13a. The second outer plating layer 13c, which is relatively dense, covers the fourth thermal spraying electrode layer 13b having a higher porosity than the third thermal spraying electrode layer 13a, so that the electrolytic capacitor 1 tends to have a lower ESR.

Preferably, the second outer plating layer 13c and the fourth thermal spraying electrode layer 13b contain the same metal as a main component thereof. This reduces the contact resistance between the second outer plating layer 13c and the fourth thermal spraying electrode layer 13b, so that the electrolytic capacitor 1 tends to have a lower ESR.

The second outer plating layer 13c preferably contains copper, nickel, or tin as a main component thereof. This tends to reduce the ESR of the electrolytic capacitor 1. Here, the second outer plating layer 13c may have a single layer structure or a multilayer structure. When the second outer plating layer 13c has a multilayer structure of multiple layers, preferably, a layer in contact with the fourth thermal spraying electrode layer 13b contains copper, nickel, or tin as a main component thereof.

When the second outer plating layer 13c has a multilayer structure, the second outer plating layer 13c may include, sequentially from a side adjacent to the fourth thermal spraying electrode layer 13b, a first sub-outer plating layer 13ca and a second sub-outer plating layer 13cb.

Preferably, the first sub-outer plating layer 13ca is a nickel plating layer containing nickel as a main component thereof.

Preferably, the second sub-outer plating layer 13cb is a tin plating layer containing tin as a main component thereof.

In the LT plane shown in FIG. 2, the variation in thickness of the first external electrode 11 as measured from the first end surface 9a of the resin molding 9 and the variation in thickness of the second external electrode 13 as measured from the second end surface 9b of the resin molding 9 are each preferably 30 µm or less, more preferably 20 µm or less, still more preferably 5 µm or less.

The variation in thickness of the first external electrode 11 is determined as follows. First, with the LT plane shown in FIG. 2 exposed, the thickness of the first external electrode 11 is measured at five points in total including the bottom surface and the top surface of the laminate 30 and three points dividing the area from the bottom surface to the top surface into four equal portions. Then, the difference between the maximum and the minimum obtained from measurements of the thickness of the first external electrode 11 at these five points is determined as the variation in thickness of the first external electrode 11. When the electrolytic capacitor 1 is in a non-destructive state where the LT plane shown in FIG. 2 is not exposed, use of an X-ray fluorescence film thickness meter, a laser displacement meter, or the like enables measurement of the thickness of the first external electrode 11 at multiple points.

The variation in thickness of the second external electrode 13 is determined in the same manner as in the variation in thickness of the first external electrode 11.

Preferred ranges of dimensions of the electrolytic capacitor 1 are as follows.

Dimension in the length direction L: 3.4 mm to 3.8 mm
Dimension in the width direction W: 2.7 mm to 3.0 mm
Dimension in the thickness direction T: 1.8 mm to 2.0 mm The method of producing an electrolytic capacitor of the present invention includes: forming a first external electrode on a first end surface of a resin molding and electrically connected to an anode exposed at the first end surface, the forming of the first external electrode includes, sequentially from a side adjacent to the first end surface: performing a first thermal spraying on the first end surface of the resin molding to form a first thermal spraying electrode layer; and performing a second thermal spraying on the first thermal spraying electrode layer to form a second thermal spraying electrode layer in contact with the first thermal spraying electrode layer and having a higher porosity than the first thermal spraying electrode layer; and forming a second external electrode on a second end surface of the resin molding and electrically connected to a cathode exposed at the second end surface. In the method of producing an electrolytic capacitor of the present invention, the forming of the second external electrode may include, sequentially from a side adjacent to the second end surface: performing a third thermal spraying on the second end surface of the resin molding to form a third thermal spraying electrode layer; and performing a fourth thermal spraying on the third thermal spraying electrode layer to form a fourth thermal spraying electrode layer in contact with the third thermal spraying electrode layer and having a higher porosity than the third thermal spraying electrode layer. Further, the method of producing an electrolytic capacitor of the present invention may further include: forming a first outer plating layer on a surface of the second thermal spraying electrode layer on a side thereof opposite to the first thermal spraying electrode layer after the second thermal spraying; and forming a second outer plating layer on a surface of the fourth thermal spraying electrode layer on a side thereof opposite to the third thermal spraying electrode layer after the fourth thermal spraying. Such a case is described below as a method of producing an electrolytic capacitor of Embodiment 1 of the present invention, i.e., a method of producing the electrolytic capacitor 1 shown in FIG. 1 and FIG. 2.

Producing Resin Molding

First, the valve-action metal substrate 3a including a porous layer on its surface, i.e., the anode 3, is prepared. Then, a surface of the porous layer is anodized to form the dielectric layer 5.

Next, the solid electrolyte layer 7a is formed on the dielectric layer 5 by screen printing or the like. Then, the conductive layer 7b is formed on the solid electrolyte layer 7a by screen printing or the like. Further, the cathode lead-out layer 7c is formed on the conductive layer 7b by lamination, screen printing, or the like. Thus, the cathode 7 including the solid electrolyte layer 7a, the conductive layer 7b, and the cathode lead-out layer 7c is formed.

Thus, the capacitor element 20 including the anode 3 with the dielectric layer 5 on a surface thereof and the cathode 7 opposite to the anode 3 is produced.

Next, multiple capacitor elements 20 are stacked to produce the laminate 30. Then, the laminate 30 is sealed by the sealing resin 8 using a compression mold or the like to produce the resin molding 9. In the resin molding 9, the anode 3 is exposed at the first end surface 9a, and the cathode 7 is exposed at the second end surface 9b.

Forming First External Electrode

First, the first end surface 9a of the resin molding 9 is thermally sprayed to form a thermal spraying electrode layer. Here, various conditions for thermal spraying are adjusted, for example, whereby thermal spraying electrode layers can be formed in which the first thermal spraying electrode layer 11a and the second thermal spraying electrode layer 11b in contact with the first thermal spraying electrode layer 11a and having a higher porosity than the first thermal spraying electrode layer 11a are sequentially formed from a side adjacent to the first end surface 9a.

Examples of thermal spraying materials include copper, nickel, nickel-aluminum alloys (95Ni-5Al, Ni-20Al), phosphor bronze (Cu-9Sn), a nickel-chromium alloy (Ni-20Cr), and a nickel-aluminum-molybdenum alloy (Ni-5Al-5Mo). In particular, copper, nickel, and nickel-aluminum alloys are preferred. The second thermal spraying electrode layer 11b tends to have a higher porosity when copper is used as a thermal spraying material than when nickel is used.

Examples of thermal spraying methods include plasma thermal spraying, arc thermal spraying, cold spraying, and aerosol deposition (AD). In particular, thermal spraying is preferably plasma thermal spraying for its industrial usefulness.

In plasma thermal spraying, various conditions such as blasting before thermal spraying, particle velocity, working gas temperature, and number of scans (number of paths) are adjusted, whereby the first thermal spraying electrode layer 11a and the second thermal spraying electrode layer 11b can be formed and separated from each other. For example, the number of scans is set to two, with the particle velocity being lower or the gas temperature being lower in the second scan than in the first scan, whereby the second thermal spraying electrode layer 11b having a higher porosity than the first thermal spraying electrode layer 11a can be formed in the second scan.

Next, after thermal spraying, the first end surface 9a of the resin molding 9 is plated by electroplating, for example, whereby the first outer plating layer 11c is formed on a surface of the second thermal spraying electrode layer 11b on a side opposite to the first thermal spraying electrode layer 11a. Here, the first sub-outer plating layer 11ca and the second sub-outer plating layer 11cb may be sequentially formed from a side adjacent to the second thermal spraying electrode layer 11b to produce the first outer plating layer 11c.

Thus, the first external electrode 11 electrically connected to the anode 3 exposed at the first end surface 9a is formed on the first end surface 9a of the resin molding 9. More specifically, the first external electrode 11 is formed which sequentially includes the first thermal spraying electrode layer 11a, the second thermal spraying electrode layer 11b, and the first outer plating layer 11c from a side adjacent to the first end surface 9a of the resin molding 9.

When a natural oxide film (passivation) is easily formed on the exposed surface of the anode 3, conventional methods require removal of the natural oxide film by pre-treatment such as zincate treatment before forming an external electrode on the anode 3. In contrast, when the first end surface 9a of the resin molding 9 is directly thermally sprayed as in the present embodiment, a natural oxide film on the anode 3 can be physically destroyed and the anode 3 can be directly connected to the first thermal spraying electrode layer 11a, so that pre-treatment such as zincate treatment is not required.

Forming Second External Electrode

First, the second end surface 9b of the resin molding 9 is thermally sprayed to form a thermal spraying electrode layer. Here, as in the forming a first external electrode, various conditions for thermal spraying are adjusted, for example, whereby thermal spraying electrode layers can be formed in which the third thermal spraying electrode layer 13a and the fourth thermal spraying electrode layer 13b in contact with the third thermal spraying electrode layer 13a and having a higher porosity than the third thermal spraying electrode layer 13a are sequentially formed from a side adjacent to the second end surface 9b.

Examples of thermal spraying materials include the same materials for forming the first thermal spraying electrode layer 11a and the second thermal spraying electrode layer 11b. In particular, copper, nickel, and nickel-aluminum alloys are preferred. The fourth thermal spraying electrode layer 13b tends to have a higher porosity when copper is used as a thermal spraying material than when nickel is used.

Examples of thermal spraying methods include the same methods for forming the first thermal spraying electrode layer 11a and the second thermal spraying electrode layer 11b. In particular, thermal spraying is preferably plasma thermal spraying for its industrial usefulness.

In plasma thermal spraying, various conditions such as blasting before thermal spraying, particle velocity, working gas temperature, and number of scans (number of paths) are adjusted, whereby the third thermal spraying electrode layer 13a and the fourth thermal spraying electrode layer 13b can be formed and separated from each other. For example, the number of scans is set to two, with the particle velocity being lower or the gas temperature being lower in the second scan than in the first scan, whereby the fourth thermal spraying electrode layer 13b having a higher porosity than the third thermal spraying electrode layer 13a can be formed in the second scan.

Next, after thermal spraying, the second end surface 9b of the resin molding 9 is plated by electroplating, for example, whereby the second outer plating layer 13c is formed on a surface of the fourth thermal spraying electrode layer 13b on a side opposite to the third thermal spraying electrode layer 13a. Here, the first sub-outer plating layer 13ca and the second sub-outer plating layer 13cb may be sequentially formed from a side adjacent to the fourth thermal spraying electrode layer 13b to produce the second outer plating layer 13c.

Thus, the second external electrode 13 electrically connected to the cathode 7 exposed at the second end surface 9b is formed on the second end surface 9b of the resin molding 9. More specifically, the second external electrode 13 is formed which sequentially includes the third thermal spraying electrode layer 13a, the fourth thermal spraying electrode layer 13b, and the second outer plating layer 13c from a side adjacent to the second end surface 9b of the resin molding 9.

When a natural oxide film is easily formed on the exposed surface of the cathode 7, conventional methods require removal of the natural oxide film by pre-treatment such as zincate treatment before forming an external electrode on the cathode 7. In contrast, when the second end surface 9b of the resin molding 9 is directly thermally sprayed as in the present embodiment, a natural oxide film on the cathode 7 can be physically destroyed and the cathode 7 can be directly connected to the third thermal spraying electrode layer 13a, so that pre-treatment such as zincate treatment is not required.

The first external electrode and the second external electrode may be formed at different times or at the same time. When these steps are performed at different times, the order of these steps is not limited.

Thus, the electrolytic capacitor 1 shown in FIG. 1 and FIG. 2 is produced.

Modified Example 1 of Embodiment 1

In the electrolytic capacitor of Embodiment 1 of the present invention, the first external electrode may include a first composite layer of the second thermal spraying electrode layer and the first outer plating layer inside the second thermal spraying electrode layer, and the second external electrode may include a second composite layer of the fourth thermal spraying electrode layer and the second outer plating layer inside the fourth thermal spraying electrode layer. Such a case is described below as an electrolytic capacitor of Modified Example 1 of Embodiment 1 of the present invention. The electrolytic capacitor of Modified Example 1 of Embodiment 1 of the present invention is the same as the electrolytic capacitor of Embodiment 1 of the present invention, except for the configurations of the second thermal spraying electrode layer and the fourth thermal spraying electrode layer.

Figure 5:
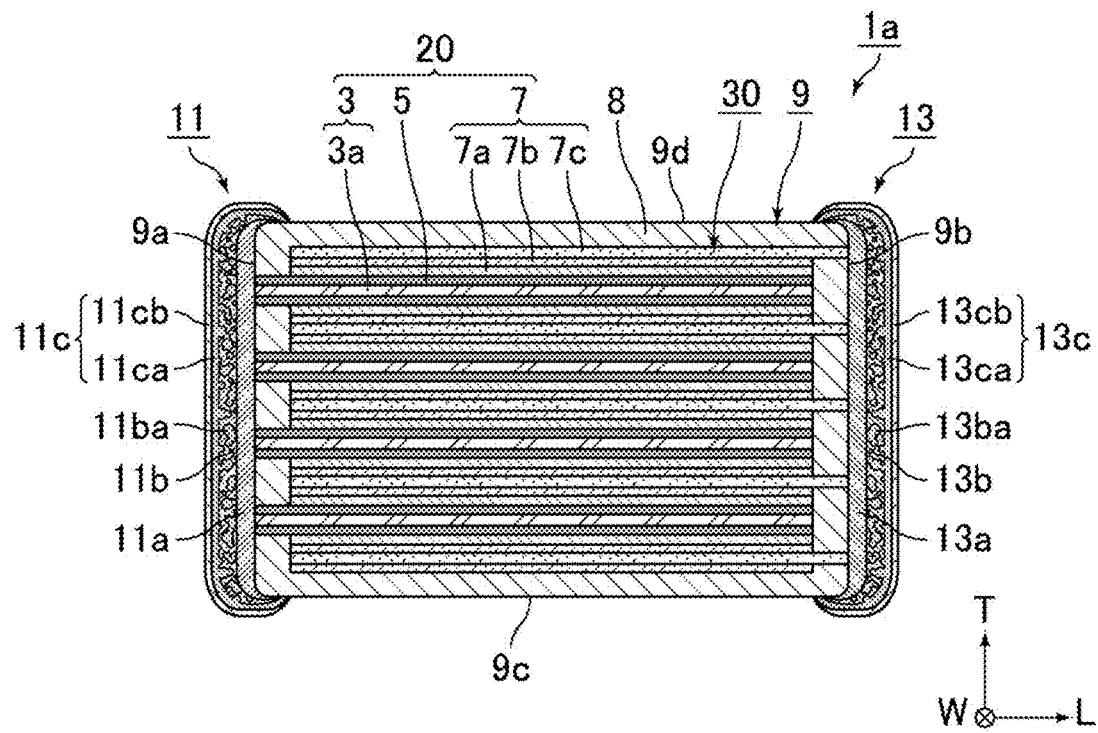
FIG. 5 is a schematic cross-sectional view showing an electrolytic capacitor of Modified Example 1 of Embodiment 1 of the present invention.

FIG. 5 is a schematic cross-sectional view showing an electrolytic capacitor of Modified Example 1 of Embodiment 1 of the present invention. As shown in FIG. 5, the first external electrode 11 of an electrolytic capacitor 1a includes a first composite layer 11ba of the second thermal spraying electrode layer 11b and the first outer plating layer 11c (here, the first sub-outer plating layer 11ca) inside the second thermal spraying electrode layer 11b. More specifically, the first external electrode 11 includes the first composite layer 11ba in a state where constituent materials derived from the first sub-outer plating layer 11ca are present in the pores of the second thermal spraying electrode layer 11b. The second thermal spraying electrode layer 11b is densified due to the first composite layer 11ba, so that the electrolytic capacitor 1a tends to have a lower ESR.

The first composite layer 11ba may be disposed partially or entirely on the second thermal spraying electrode layer 11b. When the first composite layer 11ba is disposed partially on the second thermal spraying electrode layer 11b, preferably, the first composite layer 11ba is disposed on a region in contact with the first outer plating layer 11c of the second thermal spraying electrode layer 11b.

The second external electrode 13 of the electrolytic capacitor 1a includes a second composite layer 13ba of the fourth thermal spraying electrode layer 13b and the second outer plating layer 13c (here, the first sub-outer plating layer 13ca) inside the fourth thermal spraying electrode layer 13b. More specifically, the second external electrode 13 includes the second composite layer 13ba in a state where constituent materials derived from the first sub-outer plating layer 13ca are present in the pores of the fourth thermal spraying electrode layer 13b. The fourth thermal spraying electrode layer 13b is densified due to the second composite layer 13ba, so that the electrolytic capacitor 1a tends to have a lower ESR.

The second composite layer 13ba may be disposed partially or entirely on the fourth thermal spraying electrode layer 13b. When the second composite layer 13ba is disposed partially on the fourth thermal spraying electrode layer 13b, preferably, the second composite layer 13ba is disposed on a region in contact with the second outer plating layer 13c of the fourth thermal spraying electrode layer 13b.

In a method of producing the electrolytic capacitor of Modified Example 1 of Embodiment 1 of the present invention, i.e., in a method of producing the electrolytic capacitor 1a shown in FIG. 5, the porosity in the WT plane of the second thermal spraying electrode layer 11b is increased (preferably, the porosity is 30% to 90%), which allows a portion of the first sub-outer plating layer 11ca to enter the pores of the second thermal spraying electrode layer 11b, thus forming the first composite layer 11ba. The porosity in the WT plane of the fourth thermal spraying electrode layer 13b is also increased (preferably, the porosity is 30% to 90%), which allows a portion of the first sub-outer plating layer 13ca to enter the pores of the fourth thermal spraying electrode layer 13b, thus forming the second composite layer 13ba.

Embodiment 2

In the electrolytic capacitor of the present invention, the first external electrode may include a first inner plating layer between the anode and the first thermal spraying electrode layer, and the second external electrode may include a second inner plating layer between the cathode and the first thermal spraying electrode layer. Such a case is described below as an electrolytic capacitor of Embodiment 2 of the present invention. The electrolytic capacitor of Embodiment 2 of the present invention is the same as the electrolytic capacitor of Embodiment 1 of the present invention, except for the configurations of the first external electrode and the second external electrode.

Figure 6:
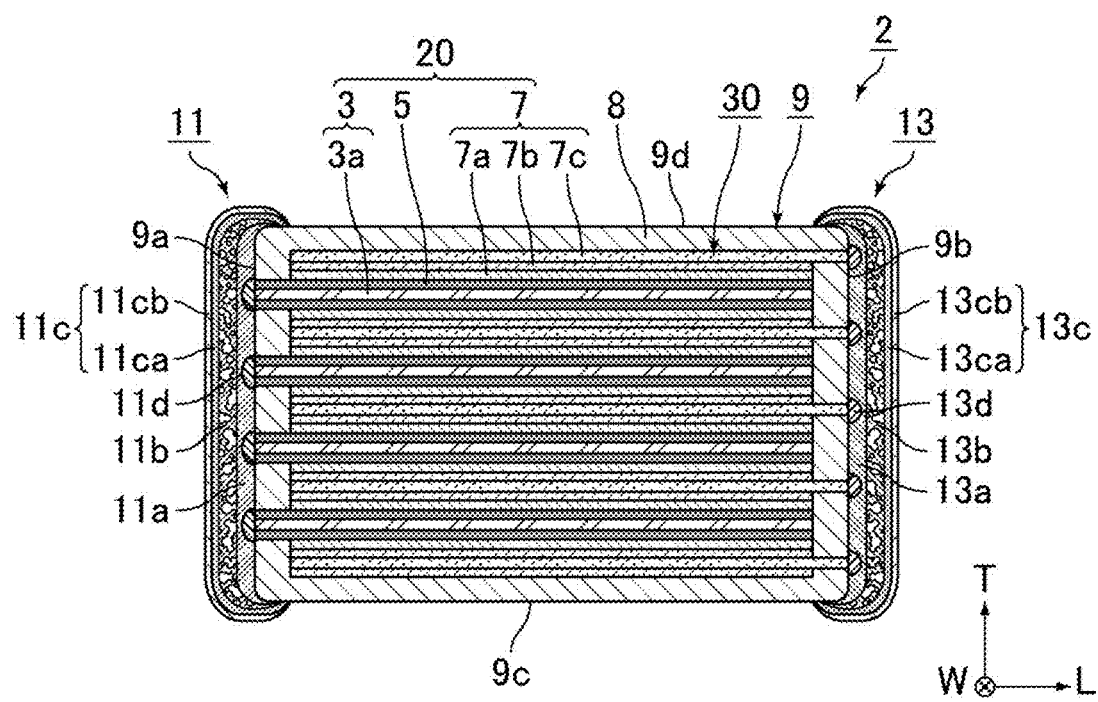
FIG. 6 is a schematic cross-sectional view showing an electrolytic capacitor of Embodiment 2 of the present invention.

FIG. 6 is a schematic cross-sectional view showing the electrolytic capacitor of Embodiment 2 of the present invention. As shown in FIG. 6, the first external electrode 11 of an electrolytic capacitor 2 includes a first inner plating layer 11d between the anode 3 and the first thermal spraying electrode layer 11a. The first inner plating layer 11d is in contact with the anode 3. The first inner plating layer 11d is in contact with the first thermal spraying electrode layer 11a. When the contact resistance between the anode 3 and the first thermal spraying electrode layer 11a is high, the presence of the first inner plating layer 11d reduces the resistance between the anode 3 and the first thermal spraying electrode layer 11a, so that the electrolytic capacitor 2 tends to have a lower ESR.

The second external electrode 13 of the electrolytic capacitor 2 includes a second inner plating layer 13d between the cathode 7 and the third thermal spraying electrode layer 13a. The second inner plating layer 13d is in contact with the cathode 7 (here, the cathode lead-out layer 7c). The second inner plating layer 13d is in contact with the third thermal spraying electrode layer 13a. When the contact resistance between the cathode 7 and the third thermal spraying electrode layer 13a is high, the presence of the second inner plating layer 13d reduces the resistance between the cathode 7 and the third thermal spraying electrode layer 13a, so that the electrolytic capacitor 2 tends to have a lower ESR.

Preferably, the first inner plating layer 11d and the second inner plating layer 13d contain copper, nickel, or silver as a main component thereof. This tends to reduce the ESR of the electrolytic capacitor 2.

When the first inner plating layer 11d and the second inner plating layer 13d are each a copper plating layer containing copper as a main component thereof or a silver plating layer containing silver as a main component thereof, the first inner plating layer 11d and the second inner plating layer 13d each have a single layer structure. The interface resistance is lower due to a smaller interface when each of the first inner plating layer 11d and the second inner plating layer 13d has a single layer structure of a copper plating layer or a silver plating layer than when each of the first inner plating layer 11d and the second inner plating layer 13d has a two-layer structure of a nickel plating layer and a silver plating layer, so that the electrolytic capacitor 2 tends to have a lower ESR. The electrolytic capacitor 2 tends to have a lower ESR when the first inner plating layer 11d and the second inner plating layer 13d are copper plating layers or silver plating layers than when these inner plating layers are nickel plating layers.

Preferably, the copper plating layer or the silver plating layer as the first inner plating layer 11d is formed by subjecting the first end surface 9a of the resin molding 9 to zincate treatment and then to displacement plating by electroless copper plating or electroless silver plating. The zincate treatment removes oxides on a surface of a metal to be plated and forms a zinc coating on the surface of the metal.

The copper plating layer or the silver plating layer as the second inner plating layer 13d can be formed in the same manner as the copper plating layer or the silver plating layer as the first inner plating layer 11d, but zincate treatment is not required. Yet, when the cathode lead-out layer 7c of the cathode 7 contains aluminum as a main component thereof, zincate treatment is preferred.

When each of the first inner plating layer 11d and the second inner plating layer 13d is a copper plating layer, the thickness of the copper plating layer is preferably 0.2 μm to 4.0 μm, more preferably 0.5 μm to 2.0 μm. When the thickness of the copper plating layer is in the above range, the plating layer has a sufficient thickness and the electrolytic capacitor 2 tends to have a lower ESR.

When each of the first inner plating layer 11d and the second inner plating layer 13d is a silver plating layer, the thickness of the silver plating layer is preferably 0.1 μm to 2.0 μm, more preferably 0.2 μm to 1.0 μm. When the thickness of the silver plating layer is in the above range, the electrolytic capacitor 2 tends to have a lower ESR, regardless of relatively small thickness.

The thickness of the copper plating layer or the silver plating layer as the first inner plating layer 11d is determined as follows. First, a micrograph is taken with the LT plane shown in FIG. 6 exposed. Then, a perpendicular line perpendicular to the first end surface 9a of the resin molding 9 is drawn on the micrograph. Next, the thickness determined by the length of the perpendicular line is measured for each copper plating layer or each silver plating layer disposed for each anode 3. An average calculated from measurements of the thickness of at least five portions is determined as the thickness of the copper plating layer or the silver plating layer as the first inner plating layer 11d.

The thickness of the copper plating layer or the silver plating layer as the second inner plating layer 13d is determined as follows. First, a micrograph is taken with the LT plane shown in FIG. 6 exposed. Then, a perpendicular line perpendicular to the second end surface 9b of the resin molding 9 is drawn on the micrograph. Next, the thickness determined by the length of the perpendicular line is measured for each copper plating layer or each silver plating layer disposed for each cathode 7. An average calculated from measurements of the thickness of at least five portions is determined as the thickness of the copper plating layer or the silver plating layer as the second inner plating layer 13d.

The first inner plating layer 11d may be formed by subjecting the first end surface 9a of the resin molding 9 to zincate treatment and then to electroless nickel plating and silver electroplating sequentially. The second inner plating layer 13d may be formed by subjecting the second end surface 9b of the resin molding 9 to zincate treatment and then to electroless nickel plating and silver electroplating sequentially.

When the anode 3 (here, the valve-action metal substrate 3a) contains aluminum as a main component thereof and when each of the first thermal spraying electrode layer 11a and the second thermal spraying electrode layer 11b of the first external electrode 11 contains copper as a main component thereof, preferably, the first external electrode 11 includes the first inner plating layer 11d containing silver as a main component thereof between the anode 3 and the first thermal spraying electrode layer 11a. The contact resistance between copper and silver is lower than the contact resistance between copper and aluminum. Thus, when each of the first thermal spraying electrode layer 11a and the second thermal spraying electrode layer 11b contains copper as a main component thereof, the electrolytic capacitor 2 tends to have a lower ESR, provided that the first inner plating layer 11d containing silver as a main component thereof is disposed between the anode 3 and the first thermal spraying electrode layer 11a.

In contrast, when each of the first thermal spraying electrode layer 11a and the second thermal spraying electrode layer 11b of the first external electrode 11 contains nickel or a nickel-aluminum alloy as a main component thereof, preferably, the first inner plating layer 11d containing silver as a main component thereof is not disposed. More specifically, when the anode 3 (here, the valve-action metal substrate 3a) contains aluminum as a main component thereof and when each of the first thermal spraying electrode layer 11a and the second thermal spraying electrode layer 11b of the first external electrode 11 contains nickel or a nickel-aluminum alloy as a main component thereof, preferably, the anode 3 is in direct contact with the first thermal spraying electrode layer 11a. The contact resistance between nickel or a nickel-aluminum alloy and aluminum is lower than the contact resistance between nickel or a nickel-aluminum alloy and silver. Thus, when each of the first thermal spraying electrode layer 11a and the second thermal spraying electrode layer 11b contains nickel or a nickel-aluminum alloy as a main component thereof, the electrolytic capacitor 1 tends to have a lower ESR, provided that the first inner plating layer 11d containing silver as a main component thereof is not disposed and that the anode 3 is in contact with the first thermal spraying electrode layer 11a as shown in FIG. 2.

As in the case of Modified Example 1 of Embodiment 1, the first external electrode 11 of the electrolytic capacitor 2 may include the first composite layer 11ba of the second thermal spraying electrode layer 11b and the first outer plating layer 11c (here, the first sub-outer plating layer 11ca) inside the second thermal spraying electrode layer 11b. As in the case of Modified Example 1 of Embodiment 1, the second external electrode 13 of the electrolytic capacitor 2 may include the second composite layer 13ba of the fourth thermal spraying electrode layer 13b and the second outer plating layer 13c (here, the first sub-outer plating layer 13ca) inside the fourth thermal spraying electrode layer 13b.

A method of producing the electrolytic capacitor of Embodiment 2 of the present invention, i.e., a method of producing the electrolytic capacitor 2 shown in FIG. 6, is the same as the method of producing the electrolytic capacitor 1 shown in FIG. 2, except that the method includes forming the first inner plating layer 11d and the second inner plating layer 13d.

In the forming the first external electrode 11, the first end surface 9a of the resin molding 9 is subjected to plating before thermal spraying, whereby the first inner plating layer 11d is formed between the anode 3 and the first thermal spraying electrode layer 11a.

When forming the first inner plating layer 11d, preferably, a copper plating layer or a silver plating layer is formed by subjecting the first end surface 9a of the resin molding 9 to zincate treatment and then to displacement plating by electroless copper plating or electroless silver plating.

For example, when the valve-action metal substrate 3a of the anode 3 is aluminum foil, zincate treatment is performed by etching a surface of the anode 3 exposed at the first end surface 9a of the resin molding 9 with an acid containing nitric acid as a main component thereof, and then forming a zinc coating on the etched surface. Preferably, the zincate treatment includes both single zincate (pickling) and double zincate (peeling). Then, displacement plating is performed by electroless copper plating or electroless silver plating, whereby a copper plating layer or a silver plating layer as the first inner plating layer 11d is formed.

A plating bath for forming a copper plating layer is preferably a neutral electroless copper plating bath and preferably has a pH of 7.0 to 8.5.

A plating bath for forming a silver plating layer is preferably a cyanide-containing electroless silver plating bath and preferably has a pH of 8.0 to 9.0.

The thickness of the copper plating layer or the silver plating layer can be adjusted by adjusting conditions such as the concentration of a plating solution and plating time for electroless copper plating or electroless silver plating.

In the forming the second external electrode 13, the second end surface 9b of the resin molding 9 is subjected to plating before thermal spraying, whereby the second inner plating layer 13d is formed between the cathode 7 and the third thermal spraying electrode layer 13a.

When a copper plating layer or a silver plating layer is formed as the second inner plating layer 13d, such a plating layer can be formed by the same method under the same conditions for forming a copper plating layer or a silver plating layer as the first inner plating layer 11d.

The first inner plating layer 11d may be formed in a two-layer structure of a nickel plating layer and a silver plating layer by sequentially performing electroless nickel plating and silver electroplating after zincate treatment of the first end surface 9a of the resin molding 9. The second inner plating layer 13d may be formed in a two-layer structure of a nickel plating layer and a silver plating layer by sequentially performing electroless nickel plating and silver electroplating after zincate treatment of the second end surface 9b of the resin molding 9.

The outer plating layer is disposed in each embodiment described above, but the outer plating layer is not required. More specifically, in the electrolytic capacitor 1 shown in FIG. 2, the electrolytic capacitor 1a shown in FIG. 5, or the electrolytic capacitor 2 shown in FIG. 6, the first outer plating layer 11c and the second outer plating layer 13c are not required. In this case, when the second thermal spraying electrode layer 11b and the fourth thermal spraying electrode layer 13b are soldered during mounting on a circuit board, high solder wettability is provided because the second thermal spraying electrode layer 11b and the fourth thermal spraying electrode layer 13b have high porosities, i.e., large surface areas.

Embodiment 3

In the electrolytic capacitor of the present invention, the second external electrode may include a printed electrode layer on the second end surface of the resin molding. In the electrolytic capacitor of the present invention, the first external electrode may include an outer plating layer on a surface of the second thermal spraying electrode layer on a side thereof opposite to the first thermal spraying electrode layer, and the second external electrode may include an outer plating layer on a surface of the printed electrode layer on a side thereof opposite to the resin molding. Such a case is described below as an electrolytic capacitor of Embodiment 3 of the present invention. The electrolytic capacitor of Embodiment 3 of the present invention is the same as the electrolytic capacitor of Embodiment 1 of the present invention, except for the configurations of the second external electrode.

Figure 7:
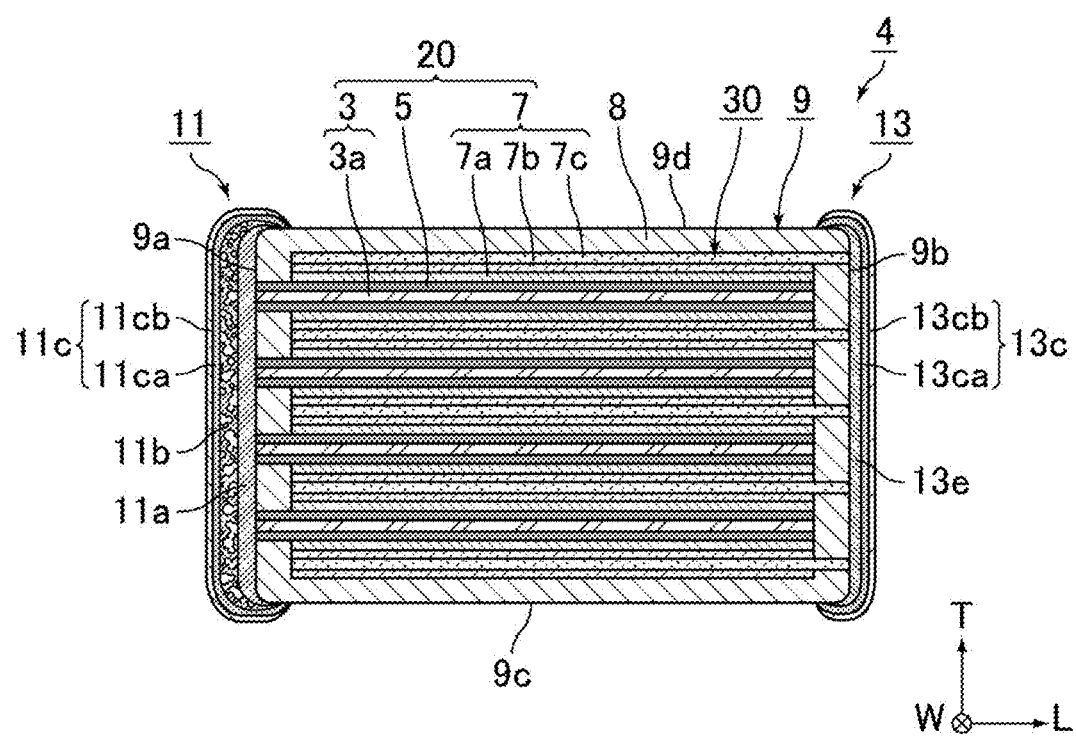
FIG. 7 is a schematic cross-sectional view showing an electrolytic capacitor of Embodiment 3 of the present invention.

FIG. 7 is a schematic cross-sectional view showing an electrolytic capacitor of Embodiment 3 of the present invention. As shown in FIG. 7, the second external electrode 13 of an electrolytic capacitor 4 sequentially includes a printed electrode layer 13e and the second outer plating layer 13c from a side adjacent to the second end surface 9b of the resin molding 9.

The printed electrode layer 13e is on the second end surface 9b of the resin molding 9 and in contact with the cathode 7 (here, the cathode lead-out layer 7c).

The second outer plating layer 13c is on a surface of the printed electrode layer 13e on a side opposite to the resin molding 9.

The configuration of the second external electrode 13 of the electrolytic capacitor 4 is effective when the main component of the cathode lead-out layer 7c is not a valve-action metal. More specifically, since a natural oxide film is not formed on an exposed surface of the cathode lead-out layer 7c at the second end surface 9b of the resin molding 9, the cathode lead-out layer 7c and the printed electrode layer 13e are directly interconnected. Thus, the electrolytic capacitor 4 tends to have a lower ESR. In the electrolytic capacitor 4, preferably, the main component of the cathode lead-out layer 7c is silver, copper, nickel, or an alloy containing at least one of these metals.

The first external electrode 11 of the electrolytic capacitor 4 may include the first composite layer 11ba of the second thermal spraying electrode layer 11b and the first outer plating layer 11c (here, the first sub-outer plating layer 11ca) inside the second thermal spraying electrode layer 11b, as in Modified Example 1 of Embodiment 1.

The first external electrode 11 of the electrolytic capacitor 4 may include the first inner plating layer 11d as the one in Embodiment 2 between the anode 3 and the first thermal spraying electrode layer 11a. The second external electrode 13 of the electrolytic capacitor 4 may include the second inner plating layer 13d as the one in Embodiment 2 between the cathode 7 and the printed electrode layer 13e.

A method of producing the electrolytic capacitor of Embodiment 3 of the present invention, i.e., a method of producing the electrolytic capacitor 4 shown in FIG. 7, is the same as the method of producing the electrolytic capacitor 1 shown in FIG. 2, except that the method includes forming the printed electrode layer 13e instead of the third thermal spraying electrode layer 13a and the fourth thermal spraying electrode layer 13b.

In the forming the second external electrode 13, the printed electrode layer 13e is formed by applying an electrode paste to the second end surface 9b of the resin molding 9 by a method such as sponge transfer, screen printing, or inkjet printing.

Preferably, the electrode paste for use in forming the printed electrode layer 13e contains silver, copper, or nickel as a main component thereof.

EXAMPLES

Examples that more specifically disclose the electrolytic capacitor of the present invention are described below. In the following examples, a solid electrolytic capacitor is described as the electrolytic capacitor of the present invention. The present invention is not limited to these examples.

Example 1

A solid electrolytic capacitor of Example 1 was produced by the following method.

Producing Resin Molding

The laminate having a configuration shown in FIG. 6 was sealed by a sealing resin containing an epoxy resin and silica particles, whereby a resin molding was produced.

Forming First External Electrode and Forming Second External Electrode

First, zincate treatment was performed by etching the first end surface and the second end surface of the resin molding with an acid containing nitric acid as a main component thereof, and then forming zinc coatings on these end surfaces. Then, the first end surface and the second end surface were sequentially electroless nickel plated and silver electroplated, whereby inner plating layers each having a two-layer structure of a nickel plating layer and a silver plating layer were formed.

Next, the resin molding was masked such that the first end surface and the second end surface were exposed, followed by plasma thermal spraying, whereby thermal spraying electrode layers covering the inner plating layers were formed. Copper was used as a thermal spraying material. Here, various conditions such as blasting (alumina blasting) before thermal spraying, particle velocity, working gas temperature, and number of scans (number of paths) were adjusted, whereby thermal spraying electrode layers were formed on each of the first end surface and the second end surface. The thermal spraying electrode layers on the first end surface included, sequentially from a side adjacent to the first end surface, a first thermal spraying electrode layer and a second thermal spraying electrode layer in contact with the first thermal spraying electrode layer and having a higher porosity than the first thermal spraying electrode layer. The thermal spraying electrode layers on the second end surface included, sequentially from a side adjacent to the second end surface, a first thermal spraying electrode layer and a second thermal spraying electrode layer in contact with the first thermal spraying electrode layer and having a higher porosity than the first thermal spraying electrode layer.

Next, the first end surface and the second end surface of the resin molding were sequentially nickel electroplated and tin electroplated after plasma thermal spraying, whereby outer plating layers each including a nickel plating layer as the first outer plating layer and a tin plating layer as the second outer plating layer were formed on a surface of each second thermal spraying electrode layer on a side opposite to the first thermal spraying electrode layer.

Thus, the solid electrolytic capacitor of Example 1 was produced.

In the solid electrolytic capacitor of Example 1, the thickness of thermal spraying electrode layers, i.e., the total thickness of the first thermal spraying electrode layer and the second thermal spraying electrode layer was 15 μm. The thickness of the thermal spraying electrode layers was measured using a field emission scanning electron microscope "JSM-7100F" available from JEOL Ltd., with the LT plane exposed by polishing the solid electrolytic capacitor.

Examples 2 to 54

Solid electrolytic capacitors of Examples 2 to 54 were produced as in the solid electrolytic capacitor of Example 1, except that the presence or absence of the inner plating layers, the thermal spraying material, and the thickness of the thermal spraying electrode layers (the total thickness of the first thermal spraying electrode layer and the second thermal spraying electrode layer) were changed as specified in Tables 1 to 3.

Evaluation

The solid electrolytic capacitors of Examples 1 to 54 were evaluated as follows. Tables 1 to 3 show the results.

ESR

The ESR at 100 kHz was measured using an LCR meter "E4980A" available from Keysight Technologies. The ESR was measured after forming the thermal spraying electrode layers and after forming the outer plating layers.

Adhesion

The first external electrode and the second external electrode were each subjected to a cross-cut test with reference to "JIS K 5600-5-6", whereby the adhesion between the first external electrode and the anode and the adhesion between the second external electrode and the cathode were evaluated. The following evaluation criteria were employed for all the squares marked in the first external electrode and the second external electrode.

Good: No squares were peeled off.

Fair: More than 0% and not more than 5% of all the squares were peeled off.

Poor: More than 5% of all the squares were peeled off.

TABLE 1

| | Specifications | | | Evaluation | | |
|---|---|---|---|---|---|---|
| | | Thermal spraying electrode layer | | ESR (mΩ) | | |
| | Inner plating layer | Thermal spraying material | Thickness (μm) | After formation of thermal spraying electrode layer | After formation of outer plating layer | Adhesion |
| Example 1 | Present | Copper | 15 | 112 | 108 | Good |
| Example 2 | | | 25 | 83 | 80 | Good |
| Example 3 | | | 40 | 51 | 48 | Good |
| Example 4 | | | 50 | 43 | 39 | Good |
| Example 5 | | | 60 | 35 | 33 | Good |
| Example 6 | | | 80 | 29 | 27 | Good |
| Example 7 | | | 100 | 27 | 25 | Good |
| Example 8 | | | 120 | 28 | 25 | Good |
| Example 9 | | | 150 | 80 | 75 | Fair |
| Example 10 | Absent | | 15 | 130 | 124 | Good |
| Example 11 | | | 25 | 100 | 92 | Good |
| Example 12 | | | 40 | 60 | 53 | Good |
| Example 13 | | | 50 | 50 | 41 | Good |
| Example 14 | | | 60 | 40 | 34 | Good |
| Example 15 | | | 80 | 37 | 31 | Good |
| Example 16 | | | 100 | 36 | 30 | Good |
| Example 17 | | | 120 | 38 | 32 | Good |
| Example 18 | | | 150 | 100 | 92 | Fair |

TABLE 2

| | Specifications | | | Evaluation | | |
|---|---|---|---|---|---|---|
| | | Thermal spraying electrode layer | | ESR (mΩ) | | |
| | Inner plating layer | Thermal spraying material | Thickness (μm) | After formation of thermal spraying electrode layer | After formation of outer plating layer | Adhesion |
| Example 19 | Present | Nickel | 15 | 160 | 157 | Good |
| Example 20 | | | 25 | 140 | 139 | Good |
| Example 21 | | | 40 | 60 | 58 | Good |

TABLE 2-continued

| | Specifications | | | Evaluation | | |
|---|---|---|---|---|---|---|
| | | Thermal spraying electrode layer | | ESR (mΩ) | | |
| | Inner plating layer | Thermal spraying material | Thickness (μm) | After formation of thermal spraying electrode layer | After formation of outer plating layer | Adhesion |
| Example 22 | | | 50 | 48 | 45 | Good |
| Example 23 | | | 60 | 35 | 32 | Good |
| Example 24 | | | 80 | 34 | 32 | Good |
| Example 25 | | | 100 | 38 | 34 | Good |
| Example 26 | | | 120 | 60 | 56 | Good |
| Example 27 | | | 150 | 120 | 115 | Fair |
| Example 28 | Absent | | 15 | 120 | 117 | Good |
| Example 29 | | | 25 | 100 | 98 | Good |
| Example 30 | | | 40 | 40 | 37 | Good |
| Example 31 | | | 50 | 29 | 27 | Good |
| Example 32 | | | 60 | 21 | 20 | Good |
| Example 33 | | | 80 | 22 | 21 | Good |
| Example 34 | | | 100 | 32 | 30 | Good |
| Example 35 | | | 120 | 50 | 46 | Good |
| Example 36 | | | 150 | 160 | 156 | Fair |

TABLE 3

| | Specifications | | | Evaluation | | |
|---|---|---|---|---|---|---|
| | | Thermal spraying electrode layer | | ESR (mΩ) | | |
| | Inner plating layer | Thermal spraying material | Thickness (μm) | After formation of thermal spraying electrode layer | After formation of outer plating layer | Adhesion |
| Example 37 | Present | Nickel-aluminum alloy (95Ni—5Al) | 15 | 180 | 175 | Good |
| Example 38 | | | 25 | 150 | 146 | Good |
| Example 39 | | | 40 | 70 | 66 | Good |
| Example 40 | | | 50 | 60 | 55 | Good |
| Example 41 | | | 60 | 40 | 36 | Good |
| Example 42 | | | 80 | 34 | 31 | Good |
| Example 43 | | | 100 | 33 | 30 | Good |
| Example 44 | | | 120 | 75 | 70 | Good |
| Example 45 | | | 150 | 125 | 121 | Fair |
| Example 46 | Absent | | 15 | 150 | 145 | Good |
| Example 47 | | | 25 | 100 | 97 | Good |
| Example 48 | | | 40 | 60 | 56 | Good |
| Example 49 | | | 50 | 50 | 45 | Good |
| Example 50 | | | 60 | 34 | 29 | Good |
| Example 51 | | | 80 | 32 | 28 | Good |
| Example 52 | | | 100 | 30 | 27 | Good |
| Example 53 | | | 120 | 65 | 61 | Good |
| Example 54 | | | 150 | 110 | 105 | Fair |

As shown in Tables 1 to 3, the solid electrolytic capacitors of Examples 1 to 54 each had a lower ESR and a higher adhesion.

The following findings were obtained when copper was used as the thermal spraying material to form thermal spraying electrode layers as in the solid electrolytic capacitors of Examples 1 to 18.

When compared between the thermal spraying electrode layers having the same thickness, the ESR is lower when the inner plating layer is present than when the inner plating layer is absent.

When compared against the thermal spraying electrode layers made of different thermal spraying materials, the ESR tends to be lower after the formation of the outer plating layers, i.e., the difference in ESR between after the formation of the thermal spraying electrode layers and after the formation of the outer plating layers tends to be greater.

The following findings were obtained when nickel was used as the thermal spraying material to form thermal spraying electrode layers as in the solid electrolytic capacitors of Examples 19 to 36.

When compared between the thermal spraying electrode layers having the same thickness, the ESR is lower when the inner plating layer is absent than when the inner plating layer is present.

The following findings were obtained when a nickel-aluminum alloy was used as the thermal spraying material to form thermal spraying electrode layers as in the solid electrolytic capacitors of Examples 37 to 54.

When compared between the thermal spraying electrode layers having the same thickness, the ESR is lower when the inner plating layer is absent than when the inner plating layer is present.

REFERENCE SIGNS LIST 1, 1a, 2, 4 electrolytic capacitor
3 anode
3a valve-action metal substrate
5 dielectric layer
7 cathode
7a solid electrolyte layer
7b conductive layer
7c cathode lead-out layer
8 sealing resin
9 resin molding
9a first end surface of resin molding
9b second end surface of resin molding
9c bottom surface of resin molding
9d top surface of resin molding
9e first side surface of resin molding
9f second side surface of resin molding
11 first external electrode
11a first thermal spraying electrode layer
13a third thermal spraying electrode layer
11b second thermal spraying electrode layer
13b fourth thermal spraying electrode layer
11ba first composite layer
13ba second composite layer
11c first outer plating layer
13c second outer plating layer
11ca, 13ca first sub-outer plating layer
11cb, 13cb second sub-outer plating layer
11d first inner plating layer
13d second inner plating layer
13 second external electrode
13e printed electrode layer
20 capacitor element
30 laminate
40 pore

The invention claimed is:

1. An electrolytic capacitor comprising:
a cuboidal resin molding including a first end surface, a second end surface, a laminate of capacitor elements each including an anode with a dielectric layer on a surface thereof and a cathode opposite to the anode, and a sealing resin sealing the laminate;
a first external electrode on the first end surface of the resin molding and electrically connected to the anode exposed at the first end surface; and
a second external electrode on the second end surface of the resin molding and electrically connected to the cathode exposed at the second end surface,
wherein the first external electrode includes, sequentially from a side thereof adjacent to the first end surface of the resin molding:
a first thermal spraying electrode layer; and
a second thermal spraying electrode layer in contact with the first thermal spraying electrode layer and having a higher porosity than the first thermal spraying electrode layer.

2. The electrolytic capacitor according to claim 1, wherein the second external electrode includes, sequentially from a side thereof adjacent to the second end surface of the resin molding:
a third thermal spraying electrode layer; and
a fourth thermal spraying electrode layer in contact with the third thermal spraying electrode layer and having a higher porosity than the third thermal spraying electrode layer.

3. The electrolytic capacitor according to claim 2, wherein the first external electrode includes a first outer plating layer on a surface of the second thermal spraying electrode layer on a side thereof opposite to the first thermal spraying electrode layer, and
the second external electrode includes a second outer plating layer on a surface of the fourth thermal spraying electrode layer on a side thereof opposite to the third thermal spraying electrode layer.

4. The electrolytic capacitor according to claim 3, wherein the first external electrode includes a first composite layer of the second thermal spraying electrode layer and the first outer plating layer inside the second thermal spraying electrode layer, and
the second external electrode includes a second composite layer of the fourth thermal spraying electrode layer and the second outer plating layer inside the fourth thermal spraying electrode layer.

5. The electrolytic capacitor according to claim 3, wherein the first outer plating layer and the second thermal spraying electrode layer contain a same metal as a main component thereof, and
the second outer plating layer and the fourth thermal spraying electrode layer contain a same metal as a main component thereof.

6. The electrolytic capacitor according to claim 3, wherein the first outer plating layer and the second outer plating layer contain copper, nickel, or tin as a main component thereof.

7. The electrolytic capacitor according to claim 2, wherein the first external electrode includes a first inner plating layer between the anode and the first thermal spraying electrode layer, and the second external electrode includes a second inner plating layer between the cathode and the first thermal spraying electrode layer.

8. The electrolytic capacitor according to claim 7, wherein the first inner plating layer and the second inner plating layer contain copper, nickel, or silver as a main component thereof.

9. The electrolytic capacitor according to claim 1, wherein the first thermal spraying electrode layer and the second thermal spraying electrode layer contain a same metal as a main component thereof.

10. The electrolytic capacitor according to claim 9, wherein each of the first thermal spraying electrode layer and the second thermal spraying electrode layer contains copper, nickel, or a nickel-aluminum alloy as a main component thereof.

11. The electrolytic capacitor according to claim 1, wherein a total thickness of the first thermal spraying electrode layer and the second thermal spraying electrode layer is 40 μm to 120 μm.

12. The electrolytic capacitor according to claim 1, wherein
the anode contains aluminum as a main component thereof,
each of the first thermal spraying electrode layer and the second thermal spraying electrode layer contains copper as a main component thereof, and
the first external electrode includes an inner plating layer containing silver as a main component thereof between the anode and the first thermal spraying electrode layer.

13. The electrolytic capacitor according to claim 1, wherein
the anode contains aluminum as a main component thereof,
each of the first thermal spraying electrode layer and the second thermal spraying electrode layer contains nickel or a nickel-aluminum alloy as a main component thereof, and
the anode is in direct contact with the first thermal spraying electrode layer.

14. The electrolytic capacitor according to claim 1, wherein the second external electrode includes a printed electrode layer on the second end surface of the resin molding.

15. The electrolytic capacitor according to claim 14, wherein the first external electrode includes an outer plating layer on a surface of the second thermal spraying electrode layer on a side thereof opposite to the first thermal spraying electrode layer, and the second external electrode includes an outer plating layer on a surface of the printed electrode layer on a side thereof opposite to the resin molding.

16. A method of producing an electrolytic capacitor, the method comprising:
forming a first external electrode on a first end surface of a resin molding and electrically connected to an anode exposed at the first end surface, the forming of the first external electrode includes, sequentially from a side adjacent to the first end surface:
performing a first thermal spraying on the first end surface of the resin molding to form a first thermal spraying electrode layer; and
performing a second thermal spraying on the first thermal spraying electrode layer to form a second thermal spraying electrode layer in contact with the first thermal spraying electrode layer and having a higher porosity than the first thermal spraying electrode layer; and
forming a second external electrode on a second end surface of the resin molding and electrically connected to a cathode exposed at the second end surface.

17. The method of producing an electrolytic capacitor according to claim 16, wherein the forming of the second external electrode includes, sequentially from a side adjacent to the second end surface:
performing a third thermal spraying on the second end surface of the resin molding to form a third thermal spraying electrode layer; and
performing a fourth thermal spraying on the third thermal spraying electrode layer to form a fourth thermal spraying electrode layer in contact with the third thermal spraying electrode layer and having a higher porosity than the third thermal spraying electrode layer.

18. The method of producing an electrolytic capacitor according to claim 17, further comprising:
forming a first outer plating layer on a surface of the second thermal spraying electrode layer on a side thereof opposite to the first thermal spraying electrode layer after the second thermal spraying; and
forming a second outer plating layer on a surface of the fourth thermal spraying electrode layer on a side thereof opposite to the third thermal spraying electrode layer after the fourth thermal spraying.

19. The method of producing an electrolytic capacitor according to claim 17, further comprising:
forming a first inner plating layer between the anode and the first thermal spraying electrode layer on the first end surface of the resin molding before the first thermal spraying; and
forming a second inner plating layer between the cathode and the third thermal spraying electrode layer on the second end surface of the resin molding before the third thermal spraying.

20. The method of producing an electrolytic capacitor according to claim 16, wherein at least one of the first thermal spraying and the second thermal spraying is a plasma thermal spraying.

* * * * *